(12) United States Patent
Lokshin et al.

(10) Patent No.: US 7,371,907 B2
(45) Date of Patent: May 13, 2008

(54) ICE METHOD FOR PRODUCTION OF HYDROGEN CLATHRATE HYDRATES

(75) Inventors: Konstantin Lokshin, Santa Fe, NM (US); Yusheng Zhao, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 700 days.

(21) Appl. No.: 10/886,229

(22) Filed: Jul. 7, 2004

(65) Prior Publication Data

US 2006/0009664 A1 Jan. 12, 2006

(51) Int. Cl.
*F17C 11/00* (2006.01)
*C07C 9/00* (2006.01)

(52) U.S. Cl. .......................................... 585/15; 62/46.1
(58) Field of Classification Search .................. 585/15; 62/46.1, 532; 422/1
See application file for complete search history.

(56) References Cited

U.S. PATENT DOCUMENTS 6,735,960 B2   5/2004   Mao et al.

2003/0089117 A1*   5/2003   Mao et al. ................... 62/46.1
2004/0143145 A1*   7/2004   Servio et al. .................. 585/15
2005/0107648 A1*   5/2005   Kimura et al. ................ 585/15

OTHER PUBLICATIONS

Wendy L. Mao, et al., "Hydrogen Clusters in Clathrate Hydrate," www.sciencemag.org, Science, vol. 297, p. 2247, Sep. 27, 2002.
Yuri A. Dyadin et al, "Clathrate Hydrates of Hydrogen and Neon," Mendeleev Communications Electron Version, Issue 5, pp. 171-212, 1999.
Yu. A. Dyadin et al, "Clathrate Formation in Water-Noble Gas (Hydrogen) Systems At High Pressures," Journal of Structural Chemistry, vol. 40, No. 5, 1999.

* cited by examiner

*Primary Examiner*—Walter D. Griffin
*Assistant Examiner*—Frank C Campanell
(74) *Attorney, Agent, or Firm*—Mark N. Fitzgerald; Juliet A. Jones

(57) ABSTRACT

The present invention includes a method for hydrogen clathrate hydrate synthesis. First, ice and hydrogen gas are supplied to a containment volume at a first temperature and a first pressure. Next, the containment volume is pressurized with hydrogen gas to a second higher pressure, where hydrogen clathrate hydrates are formed in the process.

20 Claims, 5 Drawing Sheets

ICE METHOD FOR PRODUCTION OF HYDROGEN CLATHRATE HYDRATES

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to hydrogen clathrate hydrates for hydrogen storage, and, more particularly, to a method for hydrogen clathrate hydrate production.

BACKGROUND OF THE INVENTION

A clathrate is an inclusion compound in which the guest species are enclosed on all sides of the host species forming a framework lattice. Clathrate hydrates are a wide subgroup of clathrates, with the host framework made up of hydrogen bonded $H_2O$ molecules, and guest molecules trapped inside the polyhedral cages of the framework.

Dyadin et al first recognized classical hydrogen clathrate hydrate in 1999; see Dyadin, Y. A. et al., "Clathrate hydrates of hydrogen and neon", Mendeleev Commun, 5, 209-210 (1999); and, Dyadin, Y. A. et al., "Clathrate formation in water-noble gas (hydrogen) systems at high pressures>>, J. Struct. Chem. 40, 790-795 (1999).

In 2002, Mao et al, found that hydrogen hydrate crystallizes in structure labeled as structure-II (sII) clathrate with a cubic symmetry and a lattice constant of a~17.0 Å; see, Mao, W. L., et al., "Hydrogen Clusters in Clathrate Hydrate", Science 297, 2247-2249 (2002). The crystal structure and precise composition of the hydrogen clathrate were determined by neutron diffraction as a function of pressure and temperature. The hydrogen occupancy in the clathrate $(32+X)H_2*136H_2O$, x=0-12 was found to change proportionally to changes in pressure and/or temperature, while leaving the host structure virtually intact. Hydrogen hydrates could form substituted phases with variable compositions.

Referring to FIG. 1, a $H_2$—$H_2O$ phase diagram, synthesis of hydrogen clathrate hydrate has been performed using liquid water and hydrogen gas as the starting materials. U.S. Pat. No. 6,735,960, "Composition and Method for Hydrogen Storage", issued May 18, 2004, by Mao et al., used diamond anvil cells (DAC) for preparation of clathrate. Mao et al. teaches the synthesis of hydrogen clathrate hydrates by cooling down water and hydrogen gas under a pressure of 1-6 kbar. The clathrate phase formed below 250 K during the cooling process. This process is indicated by horizontal arrow 10, traversing from Region I to Region III. Thus, Mao et al. teaches formation of clathrate directly from liquid water and hydrogen.

The present invention is a novel method where the formation of hydrogen clathrate hydrate occurs directly from ice and hydrogen, as indicated by vertical arrow 20, traversing from Region II to Region III.

Hydrogen clathrate hydrate presents a completely new technological means for hydrogen storage. Ice-like polyhedral cage frameworks of clathrate hydrate can hold substantial amounts of guest molecular hydrogen; up to 3.77% of total mass at atmospheric pressure and moderately low-temperatures (140 K~200 K). Under higher pressures, the clathrates hydrate can hold greater amounts of guest molecular hydrogen. Note that the hydrogen storage capacity of clathrate hydrates is higher than the available hydrogen-storage metal hydrides, e.g. $Mg_2NiH_4$ (3.59%) and $LaNi_5H_6$ (1.37%). A significant benefit of hydrogen clathrate hydrate is that by controlling pressure and temperature, it is possible to reversibly trap and/or release substantial amounts of molecular hydrogen.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for hydrogen clathrate hydrate synthesis. First, ice and hydrogen gas are supplied to a containment volume at a first temperature and a first pressure. Next, the containment volume is pressurized with hydrogen gas to a second higher pressure, where hydrogen clathrate hydrates are formed in the process.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention, a novel method for producing hydrogen clathrate hydrate, is based on the use of Ice I phase as a starting material and then forming the clathrate by applying hydrogen pressure at 77 K-275 K above the equilibrium point. The distinctive feature of this synthesis involves how the process crosses phase boundary from Region II to Region III, as shown in FIG. 1 by vertical arrow 20.

Figure 1:
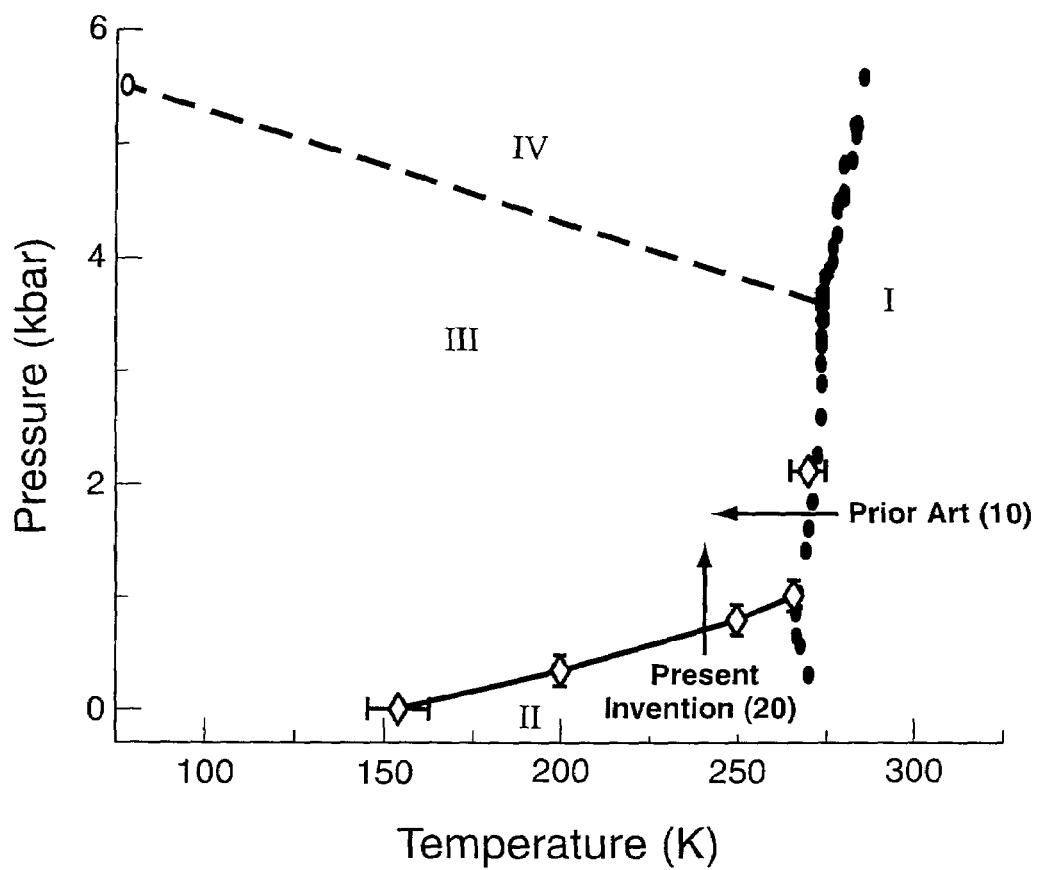
FIG. 1 is the P-T phase diagram of the $H_2$—$H_2O$ system.

Referring to FIG. 1, a phase diagram of $H_2O$—$H_2$, solid circles (●) represent the melting curve points taken from Dyadin et al, and define a phase boundary between Region I and Regions II, III, and IV. Region I defines $F(H_2)$ and $F(H_2O/H_2)$ phases corresponding to the fluid/gas $H_2$ and liquid/fluid hydrogen solution in water. Region II defines a hydrogen solution in an ice-I and $F(H_2)$ phase, bounded by a low-pressure boundary line corresponding to the equilibrium of hydrogen clathrate with a solution of hydrogen in ice-I. This low-pressure boundary line is defined by data points, represented by open diamonds (◊), determined through the method of the present invention.

Region III is defined as the hydrogen clathrate stability field and comprises hydrogen clathrate-sII, which is a cubic structure II clathrate hydrate phase and $F(H_2)$. The quadruple point, at about 265 K and 1.0 kbar, is defined at the intersection of the clathrate low-pressure boundary line with the melting curve, and denotes a point where the existing stable phases are clathrate-sII, hydrogen solution in ice-I phase, hydrogen solution in water, and fluid hydrogen.

Region IV is separated from Region III by a high-pressure boundary line (dotted line) that limits the upper end of the hydrogen clathrate stability field, separating the hydrogen clathrate-sII from a solution of hydrogen in ice-IV that together with $F(H_2)$ comprises Region IV. Another quadruple point exists at about ~274 K and ~3.7 kbar, where the stable phases are clathrate-sII, solution of hydrogen in ice-IV phase, hydrogen solution in water, and fluid hydrogen.

Figure 2:
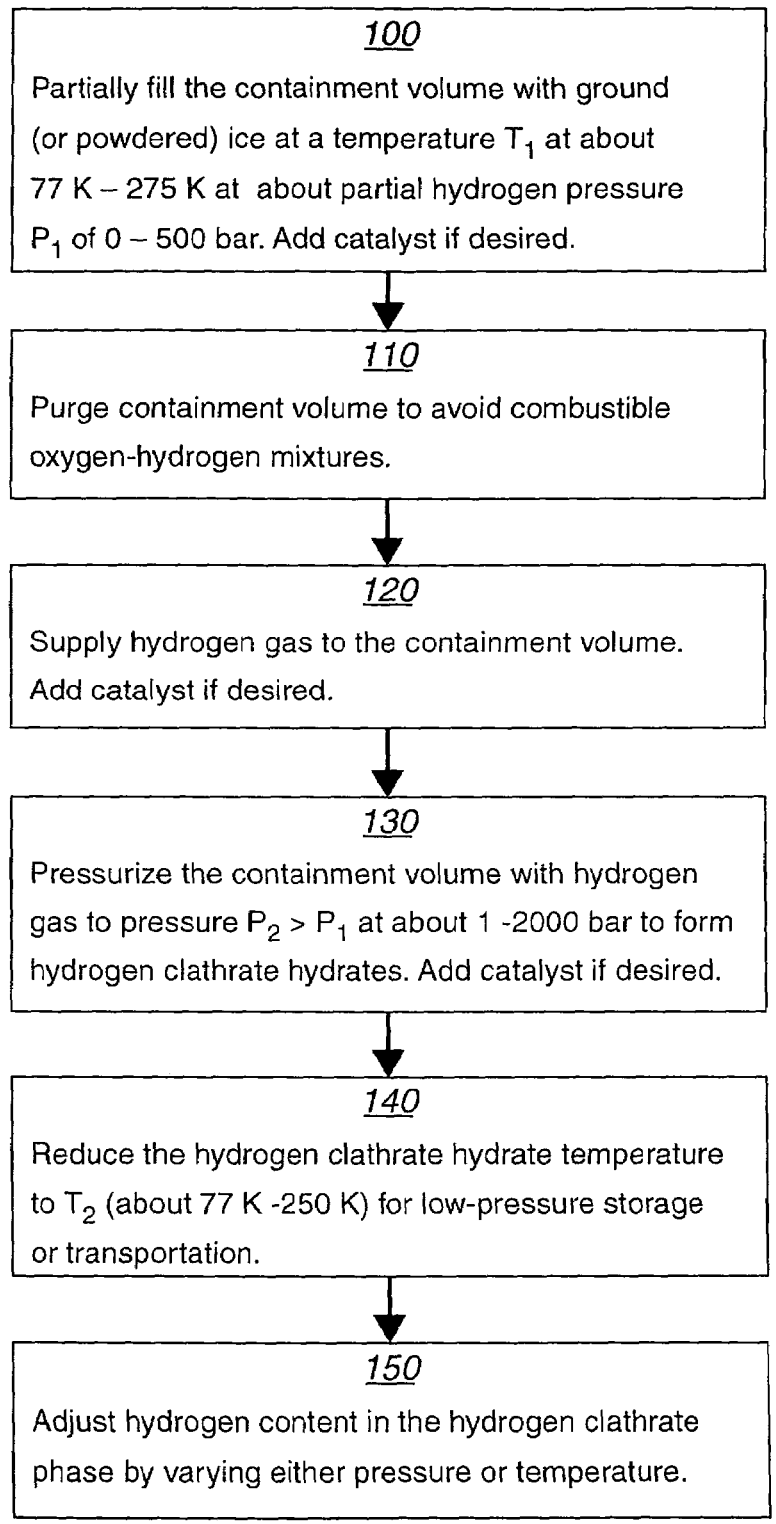
FIG. 2 is a flow diagram of a method according to the present invention for producing a hydrogen clathrate hydrate.

FIG. 2 is a flowchart displaying the method of the present invention. Step 100 creates the environment for the process of creating the hydrogen clathrate hydrates. A containment volume is partially filled with ice, preferably ground ice or powdered ice, such that the ice grain size is about 10 nm to 5 mm; the smaller the grain size of the ice, the faster the conversion to hydrogen clathrate. The containment volume is initially at a temperature $T_1$ between 77 K and 275 K and hydrogen partial pressure $P_1$ between 0 and 500 bar (within Region II in FIG. 1). The containment volume is a vessel that is able to withstand the maximum projected hydrogen pressure and support the supply and release of hydrogen gas. The vessel must include features that allow filling with ice and extracting ice or hydrogen clathrate. Cooling or heating devises may be located inside or outside the vessel. Additional features, such as pressure/temperature gauges and relief valve(s) may also be added.

The containment volume is only partially filled to allow for volume expansion as the hydrogen clathrate hydrates are formed. By starting the process with ground or powered ice, the formation of hydrogen clathrate hydrates occurs throughout the complete volume; as opposed to the prior art process of starting with liquid water, where the formation only occurs on the $H_2O$—$H_2$ boundary surface, as hydrogen is almost insoluble in water. Note that since ice-I has a lower density than water, volume penetration of hydrogen molecules into the ice-I body significantly accelerates clathrate formation.

At Step 110, the containment volume may be purged with hydrogen, nitrogen, or other neutral gas to avoid combustible oxygen-hydrogen mixtures within the containment volume.

At Step 120, hydrogen gas is supplied to the containment volume, raising the pressure, while the temperature is maintained (an isothermal process). As the pressure rises above the equilibrium point (the solid line in FIG. 1, boundary between hydrogen clathrate and a solution of hydrogen in ice-I) the hydrogen clathrate hydrates begin to form.

At Step 130, the hydrogen pressure is raised to the desired pressure $P_2$ (where $P_2 > P_1$), within the range of 1 to 2000 bar, belonging to the clathrate P-T stability field (Region III in FIG. 1). The time it takes to form the hydrogen clathrate hydrates at this new pressure is based on the ice grain size and distribution, pressure, temperature, and the catalyst used (if any).

Note that in steps 100, 120 or 130, a catalyst may be added to accelerate the nucleation and/or formation of hydrogen clathrate. Different type of catalysts known to those skilled in the art may be used for this purpose. Formation of clathrates near the ice melting point occurs faster than at lower temperatures. Thus, one type of the catalyst is a compound, which exhibits low eutectic point with $H_2O$, or when in solution with water exhibits a lower melting point. Possible catalysts include inorganic compounds, like salts and phosphates (NaCl, $CaCl_2$, $Ca(NO3)_2$, $CaHPO_4$, $(NH_4)_3PO_4$, etc.), and any light organic compounds (molecular weight less than 200), like methanol, ethanol, acetone, and urea.

At Step 140, the temperature within the containment volume may be lowered to temperature $T_2$ within the range of 77 K and 250 K ($T_2 < T_1$) to maintain the hydrogen clathrate hydrates at pressure $P_3$ ($P_3 < P_2$), chosen within the range of clathrate P-T stability field between 1 bar and 500 bar (within Region III in FIG. 1). Reducing the pressure allows for the transportation and storage of clathrate hydrate (and, consequently hydrogen) in low pressure containers that reduces the risk and increases the safety of hydrogen storage operations.

Figure 3:
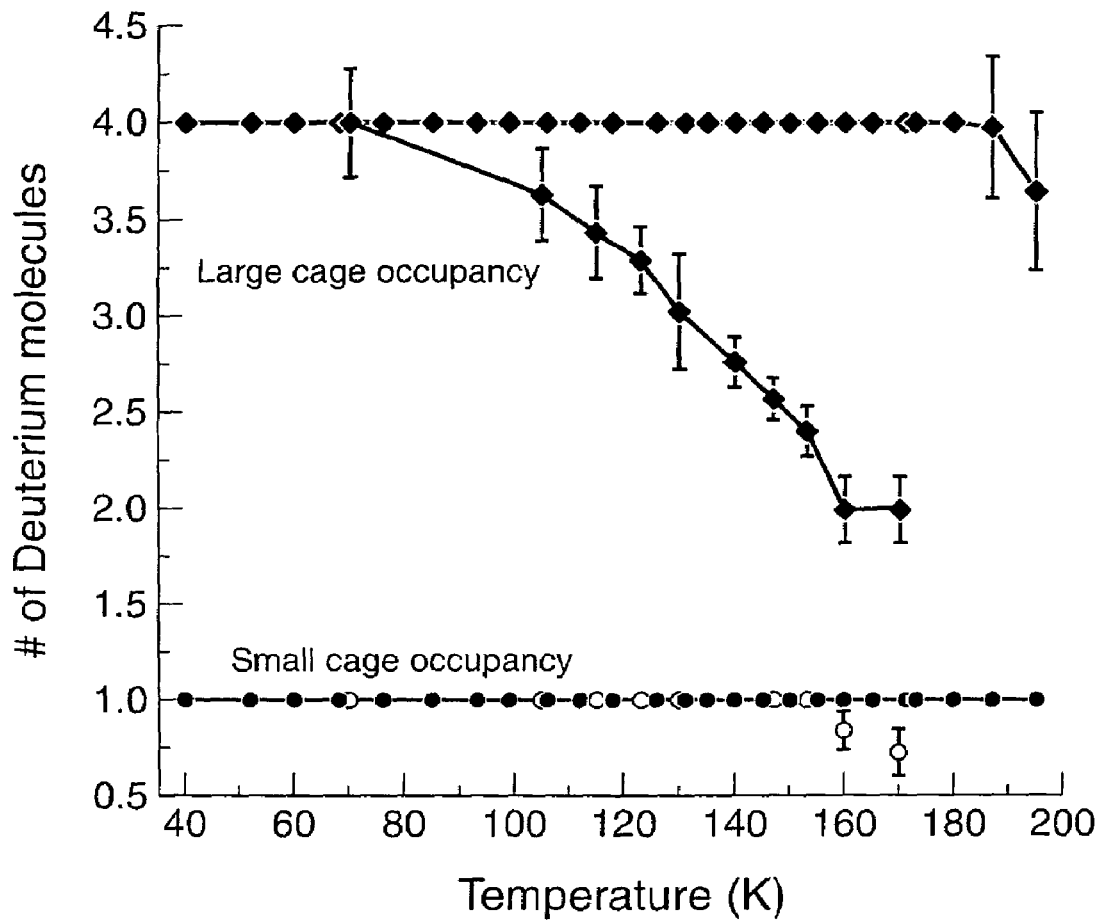
FIG. 3 is a graph showing the temperature dependence of $H_2$ occupancy in the large (diamond symbols) and small (circle symbols) cages of the hydrogen clathrate hydrate structure.

It should be noted that variation of pressure and/or temperature in Step 140 might result in the change of the hydrogen percentage stored in the clathrate hydrate. FIG. 3 is a graph showing the temperature dependence of $H_2$ occupancy in the large (diamond symbols) and small (circle symbols) cages of the hydrogen clathrate hydrates structure. Open symbols represent data obtained at ambient and filled symbols represent data under 2 kbar. This data shows that clathrate composition depends on the pressure and temperature. Thus, adjustment of the composition of the clathrate for the optimal hydrogen occupancy could be made by variation of P-T condition at step 140. In particular, decrease of temperature results in the saturation of the hydrogen content in the clathrate.

Finally, at step 150, the hydrogen content in the hydrogen clathrate phase may be adjusted by varying either the pressure or temperature within the containment (or storage) volume.

Figure 4A:
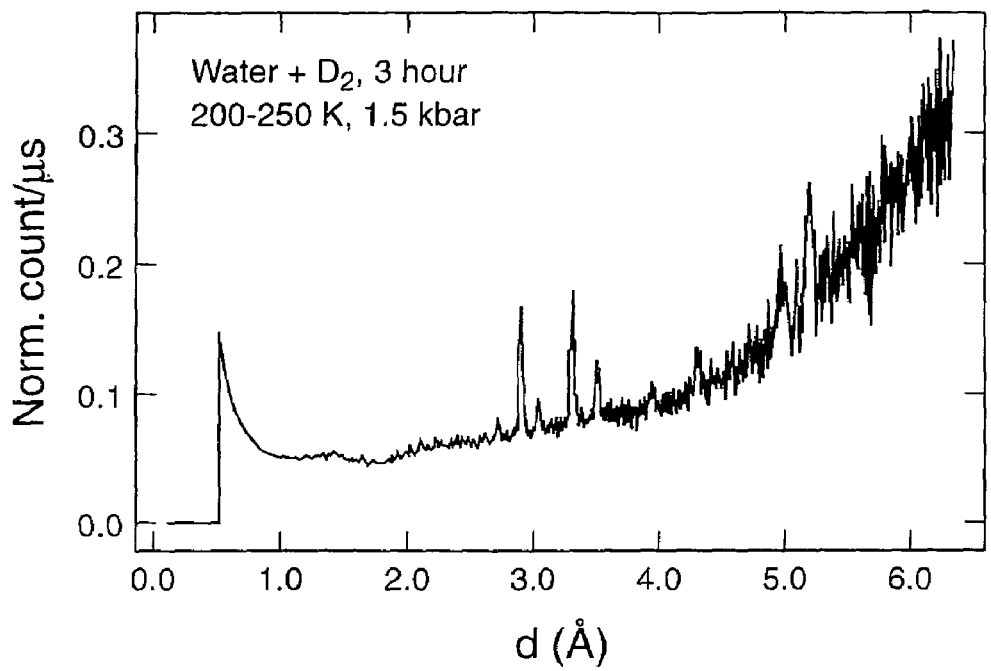
FIGS. 4a and 4b graphically show the time to clathrate s-II formation practicing the prior art method.
Figure 4B:
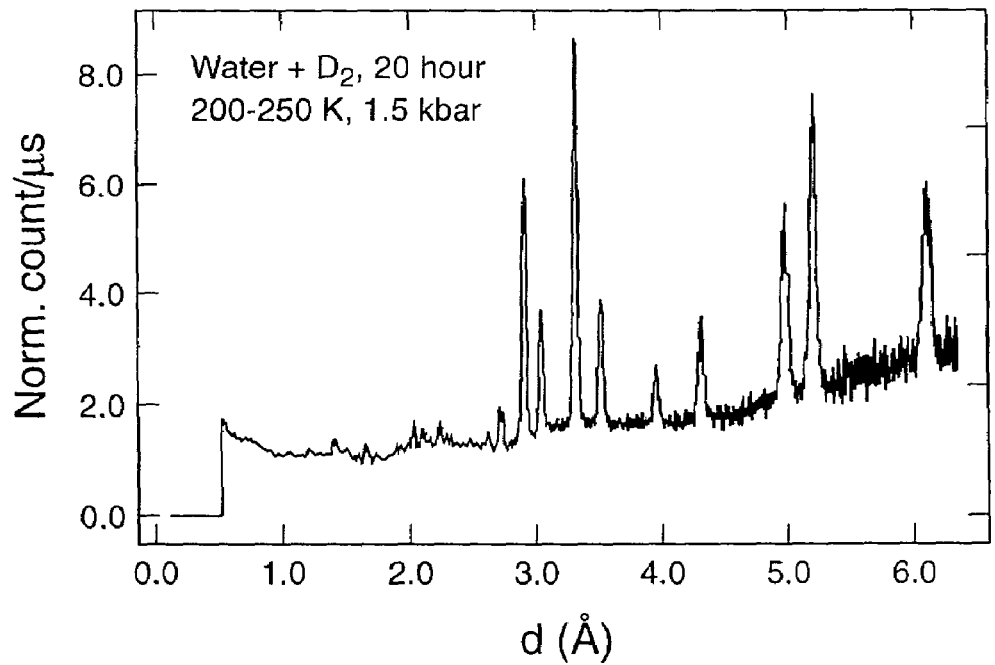

Referring now to FIGS. 4a and 4b, which represent the diffraction patterns of hydrogen clathrate taken after synthesis for 3 hours and 20 hours, respectively, practicing the prior art method. Bragg reflections on the diffractograms refer to the clathrate phase, while the halo-like background was caused mostly by diffuse scattering from water or amorphous ice. Taking an average peak-to-background ratio allowed for an estimation of the water to clathrate fractional conversion. FIG. 4a shows about a 30% conversion of water to clathrate after 3 hours of synthesis. FIG. 4b shows that even after 20 hours of synthesis, at the same conditions, only about 70% of water was converted to the clathrate phase.

Figure 5:
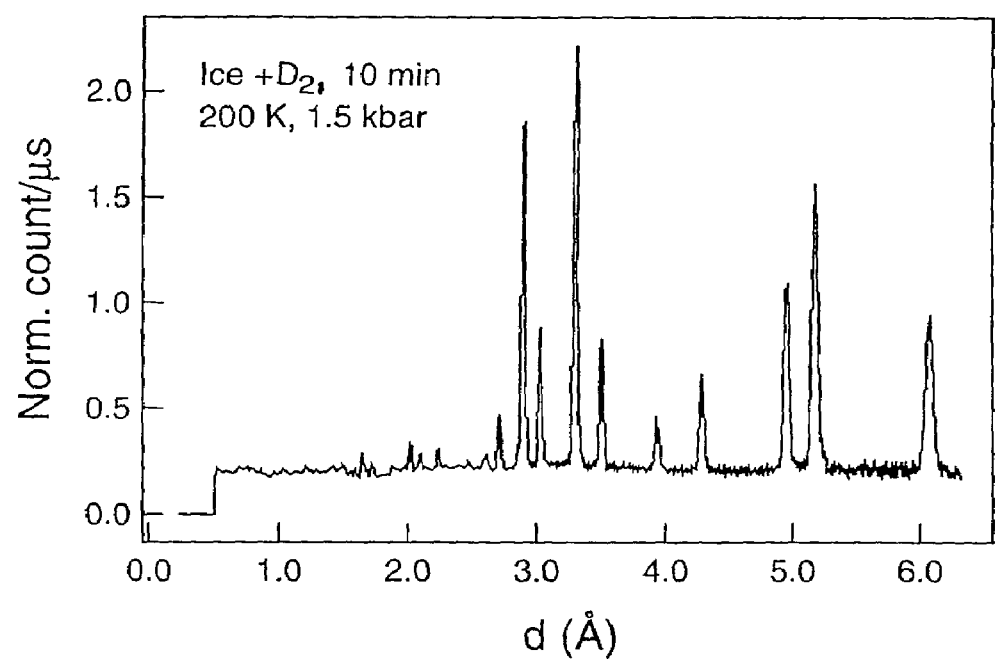
FIG. 5 graphically shows the time to clathrate s-II formation practicing the method of the present invention.

FIG. 5 represents the diffraction pattern of hydrogen clathrate practicing the method of the present invention where ice is used as a starting material with the same condition as for FIGS. 4a and 4b. Note that the transition phase into ~100% clathrate s-II is over in only a few minutes. Thus, hydrogen clathrate forms from ice-I phase on the order of 100-1000 times faster than from water.

More kinetics data on the synthesis of hydrogen clathrate s-II from ground ice-I powder at different pressures and temperatures is shown in Table 1. At high pressure, above 1 kbar, formation of clathrate s-II is extremely fast and does not depend on temperature. At low pressure the rate of clathrate synthesis decreases with decreasing temperature. However even at 150 K and 500 bar hydrogen clathrate forms in about 20 min, which is still faster than when water is used as a starting material.

TABLE 1

P-T-t conditions of clathrate formed from ground ice-I and $H_2$ gas.

| | 270 K | 250 K | 200 K | 150 K |
|---|---|---|---|---|
| 2000 bar | <2 min | <2 min | <2 min | <2 min |
| 1000 bar | — | <2 min | <2 min | <2 min |
| 500 bar | — | — | ~5 min | ~20 min |

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for hydrogen clathrate hydrate synthesis, comprising:
   providing ice and hydrogen gas to a containment volume at a first temperature and a first pressure, and
   pressurizing said containment volume with hydrogen gas to a second pressure.

2. A method for hydrogen clathrate hydrate synthesis, comprising:
   providing ice and hydrogen gas to a containment volume at a first temperature and a first pressure;
   pressurizing said containment volume with hydrogen gas to a second pressure; and
   grinding said ice to a grain size of about 10 nm to 5 mm.

3. A method for hydrogen clathrate hydrate synthesis, comprising:
   providing ice and hydrogen gas to a containment volume at a first temperature and a first pressure;
   pressurizing said containment volume with hydrogen gas to a second pressure; and
   purging said containment volume to avoid combustible oxygen-hydrogen mixtures.

4. The method of claim 1, further including:
   reducing said hydrogen clathrate hydrate to a second temperature at about 77 K to 250 K, for low pressure storage or transportation.

5. The method of claim 1, further including:
   adding a catalyst to said containment volume to accelerate clathrate formation.

6. The method of claim 5, where said catalyst is an organic compound with a molecular weight less than 200.

7. The method of claim 1, further including adjusting said hydrogen content in said hydrogen clathrate by varying said first temperature.

8. The method of claim 1, further including adjusting said hydrogen content in said hydrogen clathrate by varying said second pressure.

9. The method of claim 1, where said first temperature is about 77 K to 275 K.

10. The method of claim 1, where said first pressure is about 0 to 500 bar.

11. The method of claim 1, where said second pressure is greater than said first pressure and about 1 to 2000 bar.

12. The method of claim 2, further including purging said containment volume to avoid combustible oxygen-hydrogen mixtures.

13. The method of claim 2, further including reducing said hydrogen clathrate hydrate to a second temperature at about 77 K to 250 K, for low pressure storage or transportation.

14. The method of claim 2, further including adding a catalyst to said containment volume to accelerate clathrate formation.

15. The method of claim 2, further including adjusting said hydrogen content in said hydrogen clathrate by varying said first temperature.

16. The method of claim 2, further including adjusting said hydrogen content in said hydrogen clathrate by varying said second pressure.

17. The method of claim 3 further including reducing said hydrogen clathrate hydrate to a second temperature at about 77 K to 250 K, for low pressure storage or transportation.

18. The method of claim 3, further including adding a catalyst to said containment volume to accelerate clathrate formation.

19. The method of claim 3, further including adjusting said hydrogen content in said hydrogen clathrate by varying said first temperature.

20. The method of claim 3, further including adjusting said hydrogen content in said hydrogen clathrate by varying said second pressure.

* * * * *